UNITED STATES PATENT OFFICE.

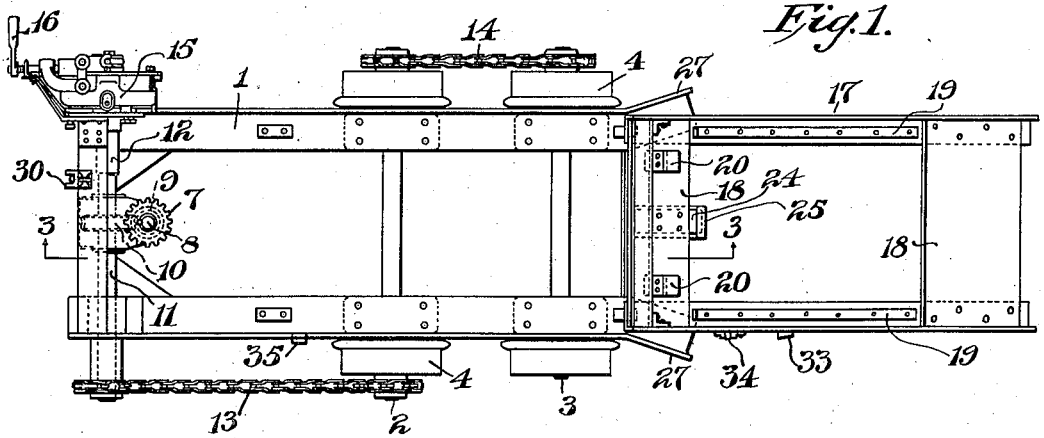
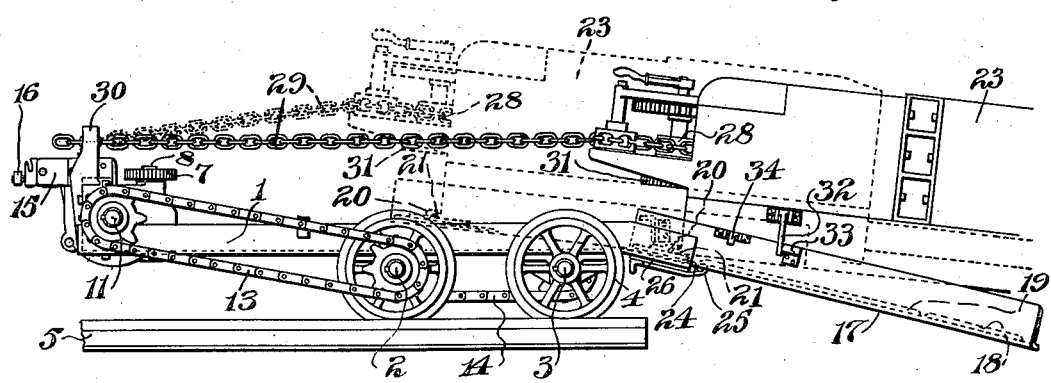
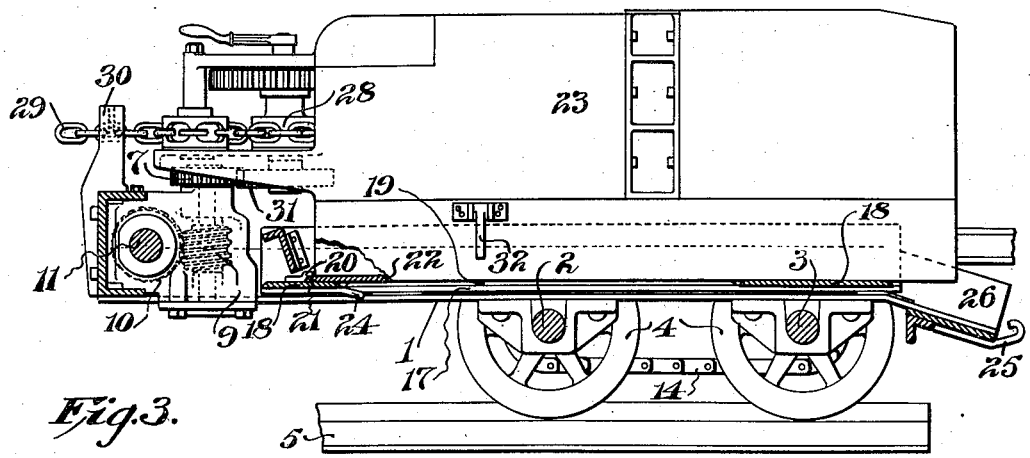

MORRIS P. HOLMES, OF CLAREMONT, NEW HAMPSHIRE, ASSIGNOR, BY MESNE ASSIGN-
MENTS, TO THE JEFFREY MANUFACTURING COMPANY, OF COLUMBUS, OHIO, A
CORPORATION OF OHIO.

MINING-MACHINE.

1,377,132.  Specification of Letters Patent.  Patented May 3, 1921.

Application filed June 13, 1916, Serial No. 103,507. Renewed July 17, 1920. Serial No. 397,146.

*To all whom it may concern:*

Be it known that I, MORRIS P. HOLMES, a citizen of the United States, residing at Claremont, in the county of Sullivan and State of New Hampshire, have invented certain new and useful Improvements in Mining-Machines, of which the following is a full, clear, and exact specification.

My invention relates to mining machines. It has for its object to provide improved means for loading such a machine upon its truck or unloading the same therefrom. A further object of my invention is to provide improved and simplified means operable automatically by a mining machine, whereby the machine is guided onto the truck, and is supported in its movement therefrom. A still further and more specific object of my invention is to provide improved machine supporting and guiding means whereby the machine may be loaded onto its truck when at an angle with respect thereto. A still further object of my invention is to produce such means as those last mentioned, wherein it is possible to maintain the height of the truck and the loading and unloading mechanism within the narrow limits necessary if the machine is to be used in mines having a low roof. These and other objects of my invention will hereinafter appear.

In the accompanying drawings I have, for purposes of illustration, shown one embodiment which my invention may assume in practice.

In these drawings,—

Figure 1 is a plan view of a truck equipped with my improved loading device, showing the truck unloaded.

Fig. 2 is a side elevation of the truck, showing the mining machine in a plurality of positions thereon.

Fig. 3 is a central sectional view taken on line 3—3 of Fig. 1, showing the machine in its final or loaded position upon the truck.

In the construction shown, I have illustrated a truck 1 mounted upon axles 2 and 3, which in turn carry wheels 4 movable back and forth upon the usual track rails 5. As illustrated, this truck is formed of laterally spaced, rigidly connected angle bars having horizontal and upstanding flanges, and the same is provided with a portion extending a substantial distance in rear of the rear axle 2, and a front end which extends only a short distance in front of the front axle 3.

At the rear end of this truck is carried any suitable means for connecting the motor of the mining machine to the truck wheels and thereby propelling the truck along the track. As shown, these means include a gear 7 carried on a vertical shaft 8 which in turn carries a worm 9 meshing with a corresponding worm gear 10 on a transverse shaft 11, journaled in a sleeve 12. As shown, this shaft 11 is connected at one end through a suitable chain and sprocket connection 13 with the rear axle 2, the latter also preferably being connected at its opposite end with the front axle 3 through a similar chain and sprocket connection 14. Controlling this truck driving mechanism, and preferably located at the opposite end of the shaft 11 from the chain and sprocket connection 13, is any suitable controlling mechanism 15 controlling the connection of the shaft 11 to the sleeve 12, which, if desired, may embody a clutch and brake of the type described and claimed in my co-pending application Serial No. 105,498, filed June 23, 1916, the same being controllable by an operator through a lever 16 so that the operator, by manipulation of said lever, may either apply the brake to the truck as it moves along the track, or disconnect the truck from its driving motor.

In my improved construction, a short pan 17 is carried on the truck and adapted to be moved by the machine from the position shown in Fig. 1 to the position shown in Fig. 3, and also to be returned by the machine from that position to the position shown in Fig. 1. This pan, as illustrated, is preferably also formed of angle bars rigidly connected by front and rear transversely disposed plates 18, the latter being preferably so disposed as to leave an opening between the same. As shown, the pan 17 is also provided with longitudinal strips 19 extending between these plates, which strips act as supports for the machine when the latter is moving over the interval between the plates. At its rear end, and preferably on the rear plate 18 thereof, this pan also carries one or more, herein two, upstanding and forwardly disposed hooks 20, preferably laterally spaced and adapted to engage an extension 21 on the bottom plate or shoe 22 of the mining machine 23. Attention is also directed to the fact that this pan is provided at its rear end with a forwardly extending projection 24, preferably slightly rounded at its front end and slightly downwardly disposed and centrally located, so that it is adapted to engage a forwardly disposed hook 25, likewise preferably centrally located and carried on the front end of the truck. In a preferred form, as shown, the front end of the latter is also inclined slightly downward, as at 26, and provided with flared sides, as at 27.

As is usual in a mining machine of the continuous cutter type, the machine is of course adapted to be propelled by the machine motor (not shown), the latter driving a cable or feed chain driving member 28 in a well known manner, so that the machine is pulled up onto its truck or removed therefrom, depending upon which end of the cable or chain, herein shown as a chain 29, is fixed. For instance, let us assume that the pan is in the position shown in Fig. 1, that is, in its down position, adapted to receive the machine to be returned to the truck, as for instance, when the machine has finished its cutting. The rear end of the feed chain 29 is then fixed to the rear end of the truck, preferably by dropping the end of the chain over a suitable slotted upstanding member or post 30 carried at the extreme rear end of the truck. When the motor starts, the machine 23 will, obviously, due to this connection, be caused to travel along the chain 29 toward the post 30 until it reaches the position shown in Fig. 3 wherein, in a preferred form, a gear 31 carried on the machine and likewise connected to the motor, meshes with the gear 7 on the truck. In this position of the machine, the truck may obviously be propelled by the motor in such a manner as to move the truck upon the rails 5. Conversely, when it is desired to unload the machine, the front end of the chain 29 is then connected to a fixture near the face so that the machine, when its motor is started, will travel in the opposite direction, or toward the face.

In the use of my improved construction, the pan 17 is moved automatically from its normal loaded position shown in Fig. 3, wherein it supports the machine, to the position shown in Fig. 1, so that it may act as a support and guide for the machine as the latter moves off the truck to its work. The pan then remains in that position until the machine has finished cutting. Then, in reloading the latter on the truck, the pan is picked up automatically and returned to its normal or loaded position by the machine. In the unloading process, the pan moves forward with the machine during the first stages of its unloading movement, i. e. until the member 24 on the pan engages with the hook 25 on the truck, whereupon, the pan being held against further forward movement, it acts as a slide for the moving machine as the rear end of the latter passes to the mine floor. In the loading process, it will be obvious that as the machine 23 moves toward the truck, the pan acts to guide the same onto the truck, and that as the machine moves farther, its protruding shoe portion 21 engages the hooks 20 on the pan and causes the latter to slide relative to the truck, the pan then moving successively from the position shown in full lines in Fig. 2 to the position shown in dotted lines herein, and thereafter, as the center of gravity of the machine is further disposed, to the normal or loaded position shown in Fig. 3, wherein the gears 7 and 31 are in mesh.

As is usual in this type of machine, an automatically acting or gravity latch may be used to lock the machine in position on the truck and thereby prevent shifting of the machine when the truck is on a grade or the like. In my improved construction, I have shown a swinging latch 32 pivoted on the machine and adapted to engage with an inclined cam 33 on the pan as the machine moves onto the truck. In this construction, the latch 32 is raised by the inclined cam, and drops behind the latter when the machine has reached the desired position in the pan. In my improved construction, a similar latch 34 is also provided on the pan and adapted to coöperate with a similar cam 35 on the truck. By the provision of these latches it will be noted that that the truck, pan, and machine are all locked together automatically, and held in the desired relation against movement in one direction, movement in the opposite direction being of course prevented by the shaft 11 and its associated parts. Obviously, however, when it is desired to unload the machine, the parts may be readily released by the operator simply raising the latches 32 and 34.

In my improved construction, it will be noted that due to the central pivotal connection 24, 25 of the pan 17, and the flared portion 27 on the truck, this pan may, if desired, be swung into a wide variety of angles relative to the truck, so as to facilitate the movement of the machine from the truck. Obviously, all necessity for accurate alinement of the machine and truck when loading is also avoided. It will also be noted that due to my improved construction wherein the pan is pivotally connected to the front of the truck, and preferably to a depending or inclined portion thereof, it is possible to locate the pan relatively close to the ground, and thereby enable the machine to be used in mines having a relatively low roof. Attention is also directed to the fact that due to my improved construction including the supplemental pan, it is possible to produce an exceedingly rigid construction in which the machine is normally supported in a rigid pan and the latter normally secured to a rigid truck. Attention is also directed to the fact that through my improved construction all necessity for tilting of the truck proper on the rails as the machine is loaded or unloaded, is effectually overcome, and that a simplified construction is produced wherein the pan may be pivoted directly upon the front of the truck without the necessity for any connection of the pan to the front axles.

While I have in this application specifically described one embodiment which my invention may assume in practice, it is to be understood that this form of the same is used for purposes of illustration, and that the invention is not limited thereto, but may be embodied in other forms without departing from its spirit, it being my intention to include all such modifications within the scope of the appended claims.

What I claim as new and desire to secure by Letters Patent is:—

1. In a mining machine, a truck, a laterally fixed guide thereon, a pan reciprocable on said truck along said guide, and means for pivotally connecting said pan and truck which permit the pan to swing laterally when the front end of the former has passed off of said truck.

2. In a mining machine, a truck, a pan reciprocable thereon, pan guiding means on the truck fixed against lateral movement and means for pivotally connecting said pan to said truck for movement vertically or laterally after a predetermined forward movement thereof.

3. In a mining machine, a truck, a sloping pan supported thereon and leading thereto and having its rear end held pivotally at an axis passing vertically through the pan, and means whereby as a machine is loaded on said truck said pan is longitudinally reciprocated therewith.

4. In a mining machine, a truck, a pan guide on the truck fixed against lateral movement, a pan connected to the guide for lateral movement with respect thereto when in loading position, and means for automatically moving said pan to or from loading position by a machine moved relative to the truck.

5. In a mining machine, a truck having a downwardly inclined end part fixed against lateral or vertical movement, a pan reciprocable on said truck, and means for operatively connecting said pan to said end as said pan is reciprocated.

6. In a mining machine, a truck having a downwardly inclined end part fixed against lateral and vertical movement, a pan longitudinally reciprocable on said truck, and means for tilting said pan downward as it reciprocates and operatively connecting the same to said end.

7. In a mining machine, a truck having a downwardly inclined end part fixed against vertical and lateral movement, a sloping pan disposed in front of said end, and means for pivotally connecting said pan to said end for lateral movement about said end.

8. In a mining machine, a truck having a downwardly inclined end, a sloping pan disposed in front of said end, and a single centrally located pivotal connection between said pan and end permitting them to independently swing laterally.

9. In a mining machine, a truck having a pivot member adjacent its front end, a pan movable longitudinally on said truck but held against lateral movement and having coöperating pivot means engageable with said pivot member, and means whereby said pan is moved as a machine is moved on or off said truck.

10. In a mining machine, a truck having a pivot member adjacent its front end, a reciprocable pan having coöperating pivot means engageable with said pivot member, and permitting said pan to swing laterally relatively to said end, and means whereby said pan is moved as a machine is unloaded or loaded on said truck.

11. In a mining machine, a truck having a downwardly inclined portion fixed against lateral and vertical movement, a longitudinally, reciprocable pan normally carried on said truck and pivotally connectible with said portion to permit it to be moved laterally independently of said inclined portion, and means for automatically reciprocating said pan as a machine moves relative to said truck.

12. In a mining machine, a truck having a sloping end, a hook carried on said end, and a pan having a member pivotally connectible with said hook, said pan being movable vertically and laterally about the latter.

13. In a mining machine, a truck having an elongated rear end and a short front end, a movable pan of substantially the length of the truck, a mining machine carried on said pan, and means whereby after a limited movement of said pan with the machine said pan is pivotally connected to the front end of said truck and is, when so connected, adapted to move laterally relatively to said front end.

In testimony whereof I affix my signature.

MORRIS P. HOLMES.